(12) United States Patent
Kirillov et al.

(10) Patent No.: US 9,497,029 B2
(45) Date of Patent: Nov. 15, 2016

(54) HARDENING OF DIRECT ANONYMOUS ATTESTATION FROM SIDE-CHANNEL ATTACK

(71) Applicant: INTEL CORPORATION, Santa Clara, CA (US)

(72) Inventors: Sergey Kirillov, Sarov (RU); Jiangtao Li, Beaverton, OR (US); Marc A. Valle, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 451 days.

(21) Appl. No.: 13/630,109

(22) Filed: Sep. 28, 2012

(65) Prior Publication Data

US 2014/0095883 A1    Apr. 3, 2014

(51) Int. Cl.
| | |
|---|---|
| *H04L 29/06* | (2006.01) |
| *H04L 9/32* | (2006.01) |
| *H04L 9/00* | (2006.01) |
| *H04L 9/08* | (2006.01) |

(52) U.S. Cl.
CPC .............. *H04L 9/3281* (2013.01); *H04L 9/003* (2013.01); *H04L 9/0891* (2013.01); *H04L 9/3247* (2013.01); *H04L 2209/046* (2013.01)

(58) Field of Classification Search
USPC .................................................. 713/156, 176
See application file for complete search history.

(56) References Cited

U.S. PATENT DOCUMENTS

| | | | |
|---|---|---|---|
| 2009/0129600 A1* | 5/2009 | Brickell et al. ............... | 380/282 |
| 2010/0332578 A1* | 12/2010 | Gopal et al. ................. | 708/650 |
| 2011/0029588 A1* | 2/2011 | Ross ............................ | 708/254 |

OTHER PUBLICATIONS

Moller, Bodo, "Securing Elliptic Curve Point Multiplication against Side-Channel Attacks", Information Security—ISC 2001, Springer-Verlag LNCS 2200, pp. 324-334.

\* cited by examiner

*Primary Examiner* — Joseph P Hirl
*Assistant Examiner* — Chi Nguy

(57) ABSTRACT

Various embodiments are generally directed to hardening the performance of calculations of a digital signature system for authenticating computing devices against side-channel attacks. An apparatus comprises a processor circuit and an interface operative to communicatively couple the processor circuit to a network; a storage communicatively coupled to the processor circuit and arranged to store instructions operative on the processor circuit to digitally sign a message to create a first signature using a modular arithmetic operation arranged to compensate for a value of a variable greater than a modulus without use of a branching instruction; and transmit the first signature to a verifying server via the network. Other embodiments are described and claimed herein.

28 Claims, 9 Drawing Sheets

HARDENING OF DIRECT ANONYMOUS ATTESTATION FROM SIDE-CHANNEL ATTACK

BACKGROUND

The increasing use of computing devices in all manner of tasks including handling of commercially valuable or personally identifiable information, performing important financial transactions, and controlling dissemination of confidential information has made the ability to authenticate computing devices as being trustworthy ever more important. Over time, various digital signature systems have been devised to enable a computing device to prove itself to be trustworthy, but various issues have arisen along the way.

Earlier digital signature systems involved the use of private keys by computing devices seeking to prove their trustworthiness in a manner that made the private keys assigned to those computing devices all too vulnerable to becoming compromised, and that enabled the identity of those computing devices and/or their operators all too easy to determine. Some proposals attempted to address these concerns by providing an issuer of keys that would be constantly available to fill requests for private keys for every instance in which a computing device needed a private key to prove itself trustworthy, but the provision of such a constantly available issuing service proved impractical. More recently devised digital signature systems, including direct anonymous attestation (DAA) and a variant of DAA promulgated by Intel® Corporation called Enhanced Privacy ID (EPID), have sought to remedy these issues by using various techniques to provide greater security for private keys assigned to computing devices, to enable the use of digital signing to prove trustworthiness in a manner preserving anonymity, and to make the issuing of keys far more infrequent.

However, despite all of the improvements provided by such recent digital signature systems, vulnerabilities to side-channel attacks to surreptitiously derive private keys remain, including monitoring execution of branch instructions, monitoring memory and/or cache accesses, and monitoring procedure execution times, etc., as calculations that implement portions of a digital signature system are performed.

DETAILED DESCRIPTION

Figure 1:
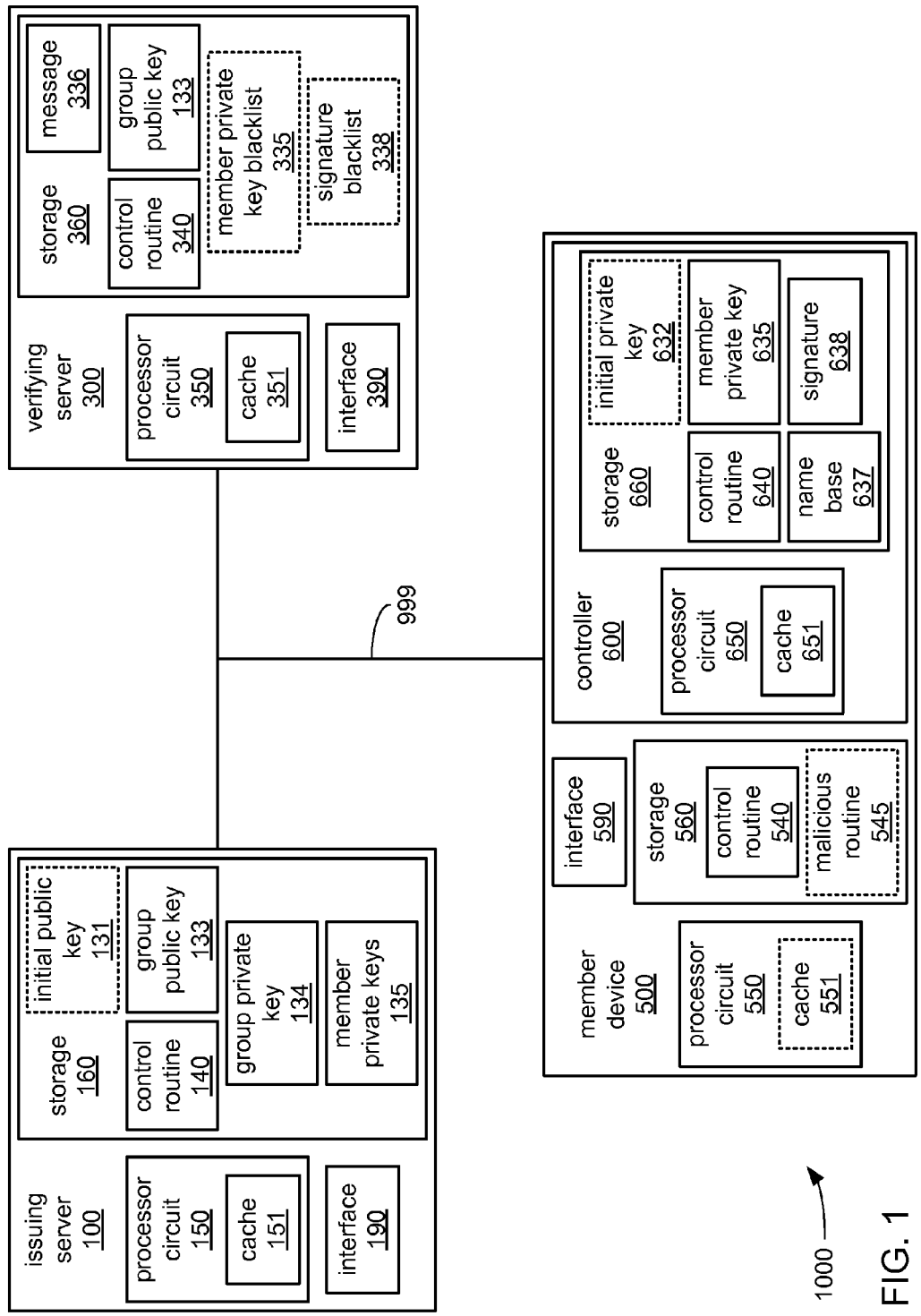
FIG. 1 illustrates a first embodiment of interaction among computing devices.

Various embodiments are generally directed to hardening the performance of calculations of a digital signature system for authenticating computing devices against side-channel attacks. More specifically, in a digital signature system, approaches are taken in performing various calculations by various computing devices in the roles of issuer, verifier and/or member that render the performance of those calculations resistant to monitoring by malicious software that may be present on one or more of those computing devices to attempt to compromise security.

In performing the calculations necessary to issue keys, to digitally sign messages, and/or to verify signatures, various techniques are employed to avoid execution of branches and/or engage in a pattern of accessing tables that may cause detectable cache behavior, non-sequential memory accesses or changes in execution time that may serve as clues to malicious software that may compromise a private key. Stated differently, one or more of these calculations are performed in a manner resulting in relatively constant execution times, relatively uniform cache behavior and relatively sequential memory address accesses each time they are performed, regardless of the values of one or more parameters.

Modular arithmetic operations are performed in ways in which branch instructions arising from the fact of there being a modulus values are avoided such that the same sequence of instructions is always executed regardless of the size of various values relative to the modulus. Point multiplication and multi-exponentiation operations are performed in ways that avoid accesses to tables being made conditional and avoid the organization of tables in cache lines such that cache behavior changes depending on which table entries are accessed.

In one embodiment, for example, an apparatus comprises a processor circuit; and an interface operative to communicatively couple the processor circuit to a network; a storage communicatively coupled to the processor circuit and arranged to store a sequence of instructions operative on the processor circuit to digitally sign a message to create a first signature using a modular arithmetic operation arranged to compensate for a value of a variable greater than a modulus without use of a branching instruction; and transmit the first signature to a verifying server via the network. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a digital signature system 1000 comprising an issuing server 100 operated by a certifying authority to issue keys, at least one verifying server 300 operated by one or more organizations to control access to various services by verifying signatures, and at least one member device 500 operated by one or more individual operators seeking to make use of those various services by providing a signature that it creates. Each of these computing devices 100, 300 and 500 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc.

As depicted, these computing devices 100, 300 and 500 exchange signals conveying keys, messages and signatures involved in authenticating the member device 500 through a network 999, although one or more of these computing devices may exchange other data entirely unrelated to such authentication. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, and as will be explained in greater detail, the member device 500 is operated by an operator seeking to employ the member device 500 to gain access to a service (e.g., online access to a bank account, a purchasing account, an email account, confidential data, etc.) to which access is controlled by the verifying server 300. The member device 500 creates a signature using a private member key issued to it and sends that signature to the verifying server 300 to be verified using a group public key issued to it. The issuing server 100 is operated by a certifying authority to issue both the private member key to the member device 500 and the group public key to the verifying server 300. As will be explained, this provision of keys may take place entirely via the network 999. Alternatively, at least the member private key may be incorporated into the member device 500 via a mechanism other than the network 999, possibly as part of manufacturing it or preparing it for use by a particular operator.

In various embodiments, the issuing server 100 comprises one or more of a storage 160, a processor circuit 150, and an interface 190 coupling the issuing server 100 to the network 999. The processor circuit 150 may comprise a cache 151. The storage 160 stores one or more of a control routine 140, a group public key 133, a group private key 134, and a multitude of member private keys 135. The storage 160 may also store an initial public key 131. In executing a sequence of instructions of the control routine 140, the processor circuit 150 is caused to generate the group public key 133 and the corresponding group private key 134 as a basis for enabling authentication among computing devices belonging to a specified group. The group may comprise computing devices used by personnel of a specific organization, such as a corporation, a government, etc. Alternatively, the group may comprise a product line of computing devices produced by a specific manufacturer, and/or computing devices employing one or more specific components of a specific manufacturer such as a processor circuit, a chipset, etc.

The processor circuit 150 is then caused to employ the group public key 133 and the group private key 134, along with randomly generated numbers, to generate the multitude of member private keys 135. Any of a number of cryptosystems may be employed by the processor circuit 150 in generating these keys, including and not limited to Rivest Shamir Adleman (RSA) and elliptic curve cryptography (ECC). The processor circuit 150 may then be caused by the control routine 140 to operate the interface 190 to transmit the group public key 133 to one or more computing devices to be employed in verifying signatures (e.g., the verifying server 300) via the network 999. The processor circuit 150 may also be caused to operate the control routine 140 to transmit individual ones of the multitude of member private keys 135 to individual computing devices employed in creating those signatures (e.g., the member device 500), or individual ones of the multitude of member private keys 135 may be loaded into such individual computing devices at the time of their manufacture and/or configuration for use.

In various embodiments, the verifying server 300 comprises one or more of a storage 360, a processor circuit 350, and an interface 390 coupling the verifying server 300 to the network 999. The processor circuit 350 may comprise a cache 351. The storage 360 stores one or more of a control routine 340, the group public key 133 provided by the issuing server 100, and a message 336 to be provided to member devices for use in creating signatures. The storage 360 may also store a member private key blacklist 335 and/or a signature blacklist 338. In executing a sequence of instructions of the control routine 340, the processor circuit 350 may be caused to operate the interface 390 to receive the group public key 133 from the issuing server 100 via the network 999. Regardless of how the verification server 300 receives the group public key 133, the processor circuit 350 stores it in the storage 360 for use in verifying signatures received from member devices of the group associated with the group public key 133.

The processor circuit 350 is then caused to operate the interface 390 to await the receipt of signals via the network 999 from a member device belonging to the group associated with the group public key 133 (e.g., the member device 500) conveying a request for access to whatever service that the verifying server 300 may control access to (e.g., online access to a bank account, a purchasing account, an email account, confidential data, etc.). Upon receipt of such a request, the processor circuit 350 operates the interface 390 to exchange signals via the network 999 with that requesting member device to specify one or both of a message and a base to be used by that requesting member device in creating a signature for the verifying server 300 to verify. Presuming, that the message 336 is specified to be used in creating a signature, the processor circuit 350 transmits the message 336 to the requesting member device for that requesting member device to digitally sign. The processor circuit 350 then awaits the return of a signature from that requesting device, the signature being formed by the requesting device digitally signing the message 336 using the member private key issued to it by the issuing server 100 and using whatever base has been agreed upon between the verifying server 300 and that requesting member device. Upon receiving the signature, the processor circuit 350 is caused to use the group public key 133 to verify that the received signature was created by a member device having possession of a valid member private key created from the group public key 133 and its corresponding group private key 134. Presuming that verification of the signature is successful, the verification server 300 then grants the requesting member device access to whatever service the verification server 300 controls access to.

In various embodiments, the member device 500 comprises one or more of a storage 560, a processor circuit 550, an interface 590 coupling the member device 500 to the network 999, and a controller 600. The storage 560 stores a control routine 540 and possibly a malicious routine 545. The controller 600 comprises a storage 660 and a processor circuit 650. Either of the processor circuits 550 or 650 may comprise a cache 551 or 651, respectively. The storage 660 stores one or more of a control routine 640, a member private key 635, a name base 637, and (when generated) a signature 638. The storage 660 may also store an initial private key 632.

As will be explained in greater detail, the controller 600 is essentially a computing device within the computing device 500, with the processor circuit 650, storage 660 and control routine 640 creating an operating environment that is relatively independent of the operating environment created by the processor circuit 550, storage 560 and control routine 540. The processor circuit 650 of the controller 600 is caused by the control routine 640 to perform one or more functions in support of functions that the processor circuit 550 is caused to perform by the control routine 540. As will be described in greater detail, among the functions performed by the processor circuit 650 are calculations associated with creating the digital signature 638 to be transmitted to the verifying server 300 using at least the member private key 635. As part of securing at least the private key 635 against becoming compromised (as well as the initial private key 632, if present), the controller 600 is coupled to the rest of the member device 500, especially the processor circuit 550, in a manner that causes the operating environment of the controller 600 to be relatively isolated from the operating environment of the rest of the member device 500. This provides some degree of protection against the calculations performed by the processor circuit 650 related to authenticating the member device 500 from being monitored (at least to some degree) by the processor circuit 550 under the control of the malicious routine 545 that may be surreptitiously loaded into the storage 560 to compromise the member private key 635 and/or other aspects of authentication through use of side-channel attacks.

In executing a sequence of instructions of the control routine 540, the processor circuit 550 may be caused to operate the interface 590 to transmit a request via the network 999 to the verifying server 300 to be granted access to a service to which the verifying server 300 controls access. The control routine 540 then operates the interface 590 to engage in an exchange of signals with the verifying server 300 by which agreement is reached concerning what message and what base will be used (along with the member private key 635) to create a signature within the member device 500 to then send to the verifying server 300 for verification using the group public key 133. In some embodiments, the verifying server 300 may specify both the message and the base, requiring the member device 500 to employ them in creating a signature on the basis that if the member device 500 does not do so, the member device 500 will then be denied access to the services to which the verifying server 300 controls access. In other embodiments, the verifying server 300 may specify only one or the other of the message or the base to be used. In still other embodiments, the verifying server 300 may permit the member device 500 to employ any message and any base.

As those skilled in the art will readily recognize, the message may be practically any piece of data, including and not limited to a random number pattern, a bit-mapped image, text, etc. However, regardless of what the message is, the verifying server 300 must have possession of both the message in its unsigned original form and as a signature created by digitally signing that message to carry out verification. Thus, one of the verifying server 300 and the member device 500 must supply the other with whatever message is ultimately selected for use. The base may also be practically any piece of data. However, it is envisioned that the base is a piece of data that is in some way representative of or associated with the member device 500 and/or an operator of the member device 500 (what is sometimes referred to as a "name base"), such as a network device name assigned to the member device 500, a name or pseudonym of an operator of the member device 500, a user ID or "handle" used by an operator of the member device 500 in online activities, a phone number, an email address, an account number, etc. It is envisioned that in the case of the verifying server controlling access to an account of a type that may be associated with a particular operator of the member device 500 (e.g., a bank account, an email account, etc.), the base may be a name base such as an account number or user name of that particular operator. The use of a name base for each occasion in which digital signing is performed as part of authentication of a member device enables the verification server 300 to uniquely identify the same member device and/or operator of that member device each time verification is performed. Alternatively, the base may be randomly generated within the member device 500 each time a signature is created, thereby preventing such recognition of the member device 500 and/or its operator. It is envisioned that whether or not the verifying server 300 accepts the use of randomly generated bases depends on the nature of the service to which the verifying server 300 controls access.

In the particular example embodiment of FIG. 1, the verification server 300 requires that the member device 500 employ the message 336 and the name base 637, and the verification server 300 sends the message 336 via the network 999 to the member device 500. In response to reaching agreement concerning what message and what base are to be employed, and in response to receiving the message 336, the processor circuit 550 is caused to signal the processor circuit 650 to create a digital signature for sending back to the verification server 300. In response, the processor circuit 650 executes the control routine 640, causing the processor circuit 650 to digitally sign the message 336 using the member private key 635 and the name base 637, thereby creating the signature 638. The member private key 635 comprises one of the member private keys 135 generated and issued to the member device 500 by the issuing server 100. The processor circuits 550 and 650 then cooperate to operate the interface 590 to transmit the signature 638 to the verification device 300. Presuming that verification is successful, the member device 500 is granted access to whatever service to which the verification server 300 controls access.

As previously mentioned, the member device 500 may be provided the member private key 635 via the network 999, or by some other mechanism as the member device 500 is manufactured or as it is configured for use by a specific operator. It may be that a component of the member device 500 (e.g., the controller 600) is installed during manufacturing of the member device 500 with the member private key 635 already incorporated therein, or the member private key 635 may be programmed into the controller 600 (e.g., stored in a nonvolatile portion of the storage 660) following assembly of the member device 500. Thus, the member private key 635 may be an integral part of the member device 500. Alternatively, provision may be made during manufacture of the member device 500 for the private member key 635 to be provided by the issuing server 100 to the member device 500 via the network 999 at a later time, possibly as the member device 500 is readied for use by a specific operator (e.g., an end user who has purchased the member device 500, or has otherwise had the member device 500 put into their possession). To enable this, the initial private key 632 may be incorporated into the controller 600 as the member device 500 is manufactured. The initial private key 632 is then employed in contacting the issuing server 100 to request issuance of the member private key 635 to the member device 500 by the issuing server 100 via the network 999. Specifically, the initial private key 632 may be directly transmitted to the issuing server 100 or may be used to create a signature that is sent to the issuing server 100 in making the request.

Regardless of how the member device 500 is provided with the member private key 635, the ability of the member device 500 to use the member private key 635 to be authenticated by the verifying server 300 may be subsequently revoked in various ways, possibly depending on the nature of the cryptosystem employed in generating these keys.

Although deemed unlikely, it may be that either the group private key 134 or enough of the member private keys 135 have been compromised that it is deemed desirable to revoke all keys associated with the group, possibly in preparation for issuing new group public and private keys, and issuing new member private keys. This form of revocation is commonly referred to as "group-based revocation." To perform group-based revocation, the issuing server 100 simply signals the verifying server 300 (along with any other verifying servers belonging to the same group) to the effect that the group public key 133 is no longer valid. Subsequently, the verifying server 300 (and any other verifying servers of the group) may then be issued a new group public key and the member device 500 may be issued a new unique member private key (as well as other member devices of the group).

Although also deemed unlikely, it may be that the member private key 635 issued to the member device 500 has somehow been compromised such that it is deemed desirable to revoke it by causing verifying servers of the group (e.g., the verifying server 300) to compare member private keys of member devices of the group against a blacklist of revoked member private keys. This form of revocation is commonly referred to as "private key-based revocation." To perform private key-based revocation, the processor circuit 350, upon receiving the signature 638 from the member device 500 during verification, mathematically derives the member private key 635 from the signature (using the message 336 that was sent to the member device 500 to be signed), and then compares the member private key 635 to any private member keys indicated as having been revoked in the member private key blacklist 335.

Another approach to singling out the member private key 635 for revocation (in the unlikely event of it being compromised) is called "signature-based revocation" in which verifying servers of the group (e.g., the verifying server 300) are provided a blacklist of signatures that correspond to revoked member private keys of the group. The messages that correspond to each of the signature in the blacklist may not be provided to the verifying servers, and instead, those messages may be maintained by the issuing server that issues keys for the group (e.g., the issuing device 100). Thus, having been provided with the signature blacklist 338 (possibly by the issuing device 100), the verifying device 300 transmits the signature blacklist 338 to the member device 500 in addition to the message 336. Then, in addition to digitally signing the message 336 and sending the resulting signature 338 back to the verifying device 300, the member device 500 also performs a variation of digitally signing each of the digital signatures within the signature blacklist 338, and returns those digitally signed signatures to the verifying device 300. Upon receiving those digitally signed signatures of the blacklist 338 from the member device 500, the verifying device 300 examines each using various computations to determine if the member private key 635 corresponds to one of them, thereby indicating that the member private key 635 has been revoked.

Still another form of revocation may be the revocation of a specific member device by a specific verifying server where the specific member device is, for whatever reason, no longer accepted by the specific verifying server. This form of revocation is commonly referred to as "verifier revocation" as it is usually just the one specific verifying server that is caused to no longer accept the specific member device, while other verifying servers in the same group may very well continue to accept that specific member device. This may arise from some action of that specific member device violating a policy enforced by that specific verifying server such that the specific member device is no longer to be accepted. Verifier revocation makes use of the same message and base each time the specific member device attempts to be authenticated by the specific verifying device. Therefore, the verifying server 300 would cause the member device 500 to always use the same message 336 and the same name base 637 in each attempt to be authenticated by the verifying server 300, resulting in the same signature 638 being transmitted by the member device 500 to the verifying server 300 each time, such that the verifying server 300 would be able to recognize the member device 500 as a member device that the verifying server 300 no longer accepts.

As will be explained in greater detail, each of the issuing server 100, the verifying server 300 and the member device 500 perform a myriad of mathematical calculations in performing the issuance of keys, the verification of signatures, and the creation of signatures, respectively. It is envisioned as most likely that the calculations performed by the member device 500 in digitally signing the message 336 to create the signature 338 are the calculations that are most at risk of being monitored in side-channel attacks betraying a private key, namely the member private key 635. This is based on a presumption that the issuing server 100 and the verifying server 300 are both operated by organizations likely to employ considerable security measures in order to prevent infiltration of each of these two computing devices by malicious software. Further, unlike the issuing server 100, it is expected that the only private keys that may ever be directly provided to the verifying server 300 may be revoked member private keys in the member private key blacklist 335, such that the verifying server 300 is unlikely to ever have still-accepted private keys to be comprised. Thus, there is an expectation that the member device 500 is more likely to be infiltrated by malicious software (e.g., the malicious routine 545) attempting to perform side-channel attacks than the others of these computing devices. It is for this reason that further security measures described herein are employed to protect the performance of calculations related to authentication by the member device 500 from side-channel attacks.

In various embodiments, each of the processor circuits 150, 350, 550 and 650 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 360, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390 and 590 employ any of a wide variety of signaling technologies enabling each of computing devices 100, 300 and 500 to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 350, 550 and 650 (e.g., to implement a protocol stack or other features). Where one or more portions of the network 999 employs electrically and/or optically conductive cabling, corresponding ones of the interfaces 190, 390 and 590 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of the interfaces 190, 390 and 590 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 390 and 590 are depicted as a single block, one or more of these may comprise multiple interfaces that may be based on differing signaling technologies. This may be the case especially where one or more of these interfaces couples corresponding ones of the computing devices 100*a-b*, 300, 500 and 700 to more than one network, each employing differing communications technologies.

Figure 2:
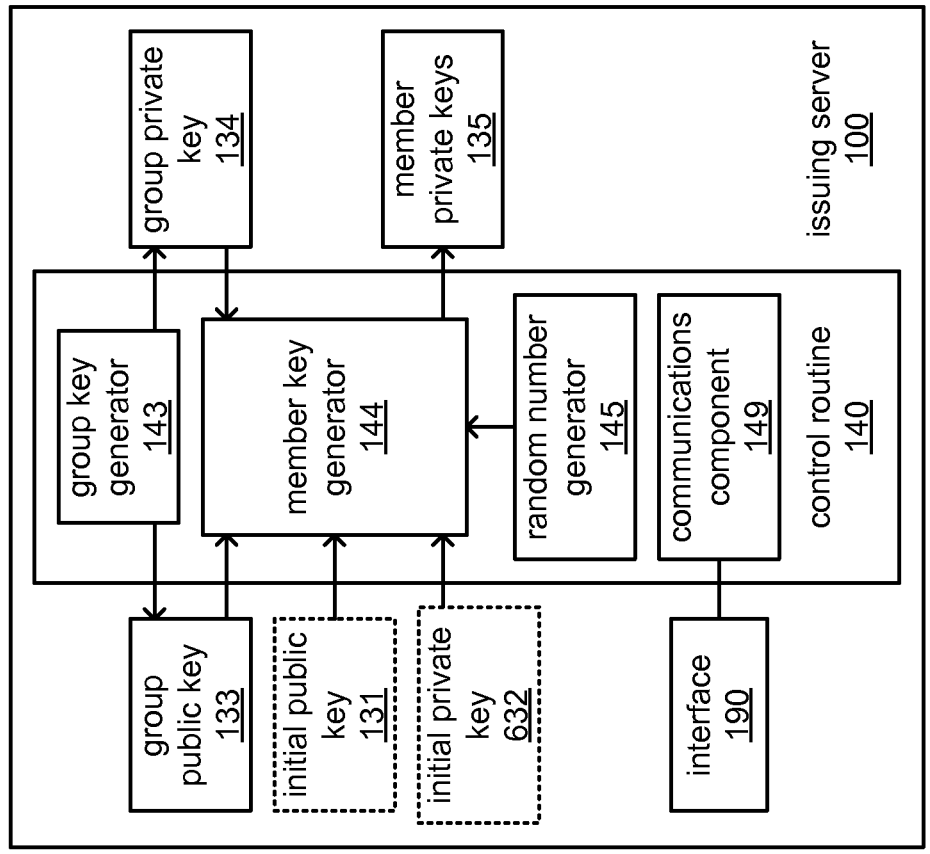
FIG. 2 illustrates a portion of the embodiment of FIG. 1.
Figure 3:
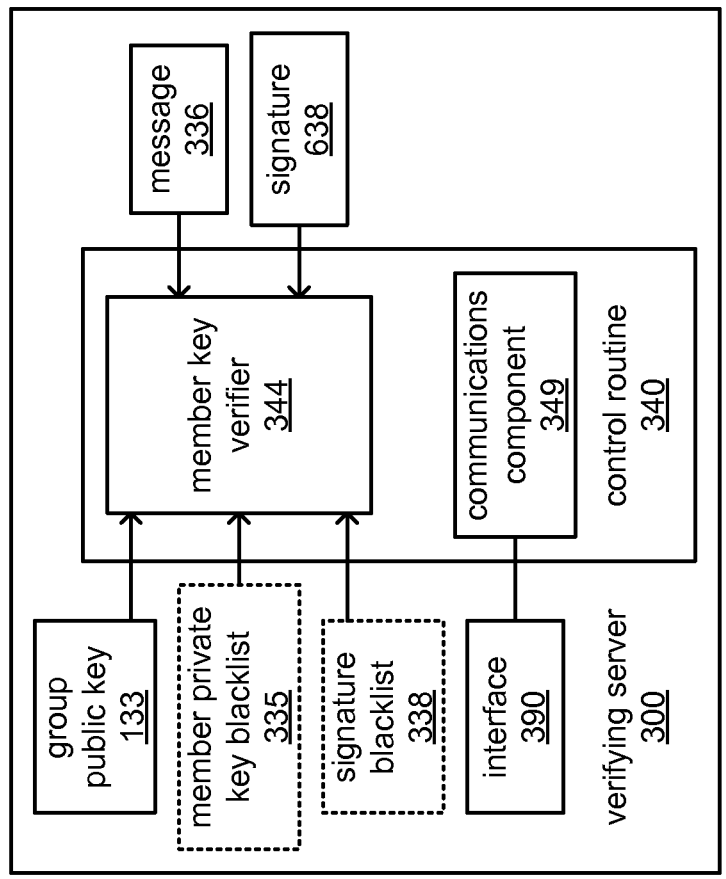
FIG. 3 illustrates a portion of the embodiment of FIG. 1.
Figure 4:
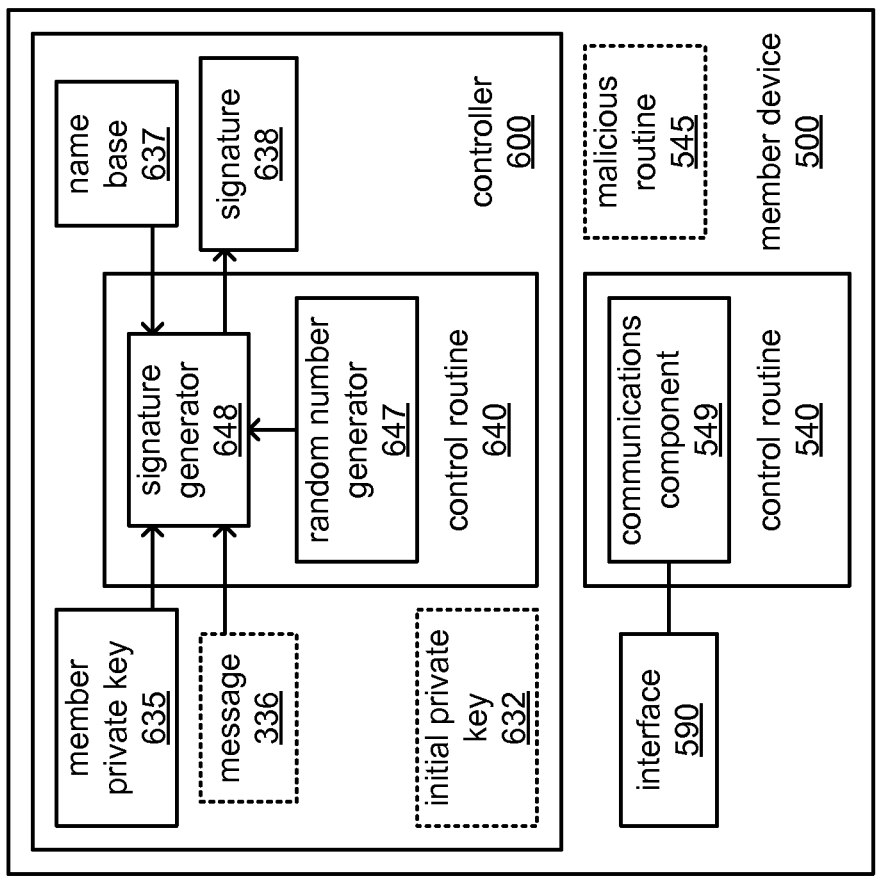
FIG. 4 illustrates a portion of the embodiment of FIG. 1.

FIGS. 2, 3 and 4, taken together, illustrate block diagrams of portions of the block diagram of FIG. 1 depicted in greater detail. More specifically, aspects of the operating environments of the computing devices 100, 300 and 500, as well as the controller 600, are depicted, in which corresponding ones of the processor circuits 150, 350, 550 and 650 (FIG. 1) are caused by execution of respective control routines 140, 340, 540 and 640 to perform the aforedescribed functions. As will be recognized by those skilled in the art, each of the control routines 140, 340, 540 and 640, including the components of which each is composed, are selected to be operative on whatever type of processor or processors that are selected to implement each of the processor circuits 150, 350, 550 and 650.

In various embodiments, one or more of the control routines 140, 340, 540 and 640 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 350, 550 and 650, including without limitation, Windows™, OS X™, Linux®, or Android OS™. Where one or more device drivers are included, those device drivers may provide support for any of a variety of other components, whether hardware or software components, that comprise one or more of the computing devices 100, 300 and 500.

Each of the control routines 140, 340 and 540 comprises a communications component 149, 349 and 549, respectively, executable by corresponding ones of the processor circuits 150, 350 and 550 to operate corresponding ones of the interfaces 190, 390 and 590 to transmit and receive signals via the network 999 as has been described. As will be recognized by those skilled in the art, each of these communications components are selected to be operable with whatever type of interface technology is selected to implement each of the corresponding ones of these interfaces.

Turning more specifically to FIG. 2, the control routine 140 comprises a group key generator 143 executable by the processor circuit 150 to generate the group public key 133 and the group private key 134 employing various calculations consistent with whatever cryptosystem is selected as their basis. The control routine 140 also comprises a member key generator 144 executable by the processor circuit 150 to generate each of the multiple member private keys 135 from the group public key 133, the group private key 134 and random numbers provided by a random number generator 145. The random number generator 145 may be implemented as a hardware component of the issuing server 100 or may be implemented as a sequence of instructions executable by the processor circuit 150. As has been discussed, the generation and/or issuance of individual ones of the member private keys 135 may be conditioned on a member device (e.g., the member device 500) providing the issuing server 100 with a valid initial private key 632 that matches the initial public key 131 (or providing the issuing server 100 with a signature created using a valid initial private key 632, rather than providing the initial private key 632, directly).

Turning more specifically to FIG. 3, the control routine 340 comprises a member key verifier 344 executable by the processor circuit 350 to verify the signature 638 using the message 336 from which the signature 638 was generated and the group public key 133. As has been discussed, the verification of the signature 638 may be further conditioned on whether the member private key 635 is found to be revoked, as determined either by comparing it to the revoked member private keys within the member private key blacklist 335, or as determined by analyzing the results of the member device 500 digitally signing each of the revoked signatures within the signature blacklist 338.

Turning more specifically to FIG. 4, the control routine 640 comprises a signature generator 648 executable by the processor circuit 650 of the controller 600 to generate the signature 638 using the member private key 635, the message 336, and either the name base 637 or a random number used as a random base provided by a random number generator 647. The random number generator 647 may be implemented as a hardware component of the controller 600 or may be implemented as a sequence of instructions executable by the processor circuit 650. As has been discussed, the member private key 635 may be incorporated into the member device 500 (more specifically, into the controller 600) as the member device 500 is assembled, or may be provided to the member device 500 at a later time via the network 999 through use of the initial private key 632 with the issuing server 100.

Figure 5:
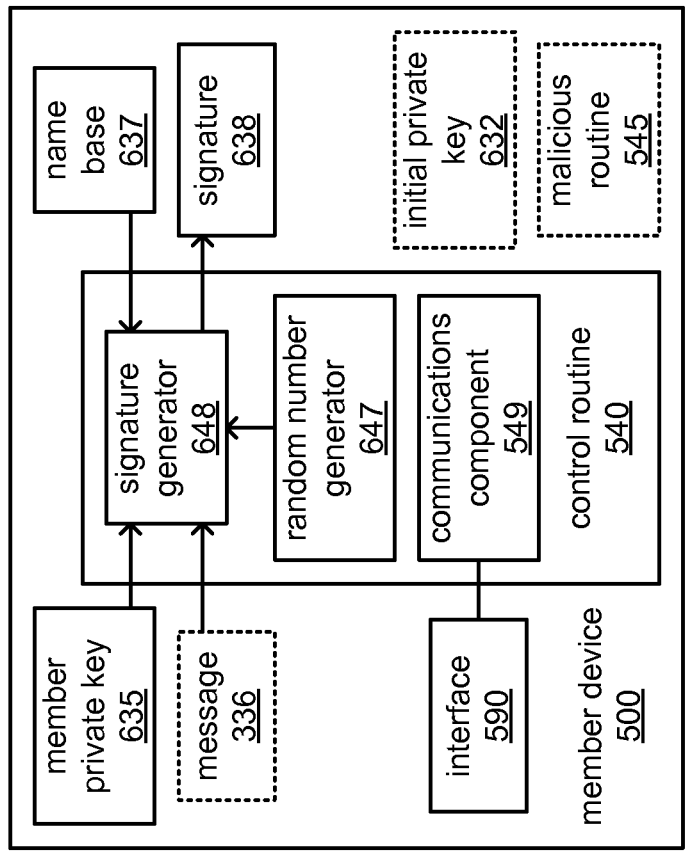
FIG. 5 illustrates a portion similar to FIG. 4, but of a second embodiment.

FIG. 5 illustrates a block diagram, similar to FIG. 4, of an alternate variant of the member device 500 for an alternate variant of the digital signature system 1000 in which the member device 500 does not comprise the controller 600. In this variant, the processor circuit 550 performs the calculation functions of the processor circuit 650 of the controller 600 related to authentication of the member device 500. Thus, unlike the member device 500 of FIG. 4, where the isolation of the processor circuit 650 and the storage 600 from the processor circuit 550 afforded a degree of security in the performance of those calculations from being monitored by the malicious routine 545, the absence of the such a separate operating environment in the variant of the member device 500 of FIG. 5 potentially results in the malicious routine 545 being able to monitor the performance of those calculations more closely.

The calculations used in various cryptosystems have some unique properties, including the use of modular arithmetic operations with an unusually large modulus. Indeed, the modulus is usually an integer large enough to be hundreds of bits wide. Thus, each instance of the modulus and various other integer values being loaded, saved and otherwise worked with by a processor circuit entails numerous sequential read and write operations that are likely to fill multiple cache lines in a typical cache system. And thus, each instance of a branch operation leading to a loading or saving of such an integer value very likely leads to cache miss cycles and a significant loading of data from other memory devices to fill multiple cache lines. Therefore, these properties of this modular arithmetic effectively lends themselves to being relatively easily monitored by malicious software that implement side-channel attacks by watching cache behavior, patterns of memory access and execution times in these arithmetic operations.

In the variant of the member device 500 depicted in FIG. 5, the malicious routine 545 potentially has relatively little difficulty observing such behaviors of the processor circuit 550 including use of the cache 551 and accesses to portions of the storage 560 during the performance of such calculations, given that the malicious routine 545 is executed by the same processor circuit. In contrast, in the version of the member device 500 depicted in FIG. 4, the malicious routine 545 may have considerably greater difficulty in observing such behaviors of the processor circuit 650, but may very well still be able to observe execution times. To mitigate the ability of the malicious routine 545 to observe behaviors or execution times to an extent that may give away enough clues to enable compromising of a private key and/or other aspects of security, the manner in which the modular arithmetic is performed by the processor circuit 550 or 650 under control of the control routine 540 or 640, respectively, is such that the order of performance of instructions, the patterns of cache line fills and memory address accesses, and the execution times remain relatively unchanged from one performance to the next, regardless of the integer values used.

Thus, some modular arithmetic operations are performed as shown in the following table, where the variables a, b, d, q, t and "mask" are all very large unsigned integers (e.g., each possibly represented with hundreds of bits), and q is the modulus:

| | |
|---|---|
| d = (a + b) mod q (modular addition) | Compute (carry, t) = a + b. Compute (borrow, d) = (carry, t) − q. Compute mask = 0 − borrow. Return d = (mask & t) \| (~mask & d). |
| d = (a − b) mod q (modular subtraction) | Compute (borrow, t) = a − b. Compute d = t + q. Compute mask = 0 − borrow. Compute d = (~mask & t) \| (mask & d). |
| d = (−a) mod q (modular negation) | Compute flag = isZero(a). Compute d = q − a. Compute mask = 0 − flag. Compute d = (~mask & d) \| (mask & a). |

Turning to the modular addition of the above table, the variable "carry" is a bit value indicating whether computing "t=a+b" results in a value of t that overflows the quantity of bits used in representing these unsigned integers. The variable "borrow" is a bit value indicating whether computing "d=t−q" results in a value of d that underflows its bit value representation as an unsigned integer. The variable "mask" is caused to become either a binary all "0" or binary all "1" depending on the "0" or "1" bit value of the "borrow" variable. Finally, each of "t" and "d" is logically ANDed to the variable "mask" and its complement, respectively, and the results of each of these logical bitwise AND operations are logically ORed to derive "d" as the output. As those familiar with more conventional approaches to performing modular arithmetic on computing devices will readily recognize, the convention use of a branch instruction (often implemented as an "if . . . then" construct) in which a resulting integer value is compared to the modulus q to determine whether or not it exceeds q has been avoided. As a result, the performance of modular addition in this manner results in the execution of the same sequence of instructions, each time, regardless of the values of the variables "a" and "b" as inputs. This results in a relatively constant execution time, and relatively unchanging patterns of cache usage and memory address accesses. Thus, this form of arithmetic addition betrays relatively little to the malicious routine 545, even if performed on the processor circuit 550.

The manner in which the modular subtraction of the above table is performed is quite similar to the manner in which the just described modular addition of the above table is performed. Again, betraying relatively little to the malicious routine 545.

Turning to the modular negation of the above table, the variable "flag" is a bit value indicating whether or not the variable "a" is a zero or non-zero value. The variable "mask" is caused to become either a binary all "0" or binary all "1" depending on the "0" or "1" bit value of the "flag" variable. Finally, each of "d" and "a" is logically ANDed to the variable "mask" and its complement, respectively, and the results of each of these logical bitwise AND operations are logically ORed to derive "d" as the output.

Thus, in each of these forms of modular arithmetic operations, the possibility of a calculation resulting in a value outside the modulus "q" is compensated for without use of a branch instruction. Instead, a bit mask and its complement are created and employed in separate logic AND operations, the results of which are combined in a logical OR operation to derive the result of the modular arithmetic operation.

Where the cryptosystem employed is ECC, in which keys are created based on points selected from an elliptic curve in a finite plane, various calculations employ point multiplication. In more conventional approaches to performing such a calculation on a computing device, it is customary to form a table of point values as a set of temporary variables. Unfortunately, depending on the size of a cache system, the manner in which typical cache pre-fetch algorithms handle the loading of tables into a cache frequently results in a first few entries of a table being loaded into available cache lines while latter entries of that table are left to be loaded later. This provides an opportunity for malicious software (e.g., the malicious routine 545) to observe whether a table entry being accessed is one of the first few table entries loaded into the cache (resulting in a cache hit) or is one of the latter table entries not yet loaded into the cache (resulting in a cache miss), thereby providing potential clues in a side-channel attack. To overcome this vulnerability, the formation of such tables in performing point multiplication is carried out by the processor circuit 550 or 650 under the control of the control routine 540 or 640, respectively, in such a way that results in the bits of each of the entries being distributed in a manner that causes the same cache behavior to occur regardless of which table entry is accessed.

Thus, point multiplication is performed as shown in the example implementation set forth in the following four tables in pseudocode detailing a main point multiplication procedure followed by a CONVERT-PRESENTION subprocedure, a STORE subprocedure and a RETRIEVE subprocedure:

| R = [b]P (point multiplication) |
|---|
| Let w be window size, where w is a small integer. Let W = $2^w$. Let t[0], ..., t[W−1] be temporary variables, where each t[i] is a point on elliptic curve. Set t[1] = P. For i = 2, ..., W−1, compute t[i] = t[i−1] + P using point addition. Set t[0] = t[W−1] + P. T = STORE (t[0], ..., t[W−1]), where T is a pre-computation table. Compute b' = CONVERT-PRESENTATION (b, w), where b' is a positive big integer same length as b. Let b'$_0$, ..., b'$_m$ be integers in [0, W−1] such that b' = b'$_0$ + b'$_1$·W + ... + b'$_m$·W$^m$ and b'$_m$ ≠ 0. RETRIEVE t[b'$_m$] from table T. In other words, call t[b'm] = RETRIEVE (T, b'm). Set R = t[b'$_m$]. For i = m−1, ..., 0:     For j = 0, ..., w−1, compute R = R + R.     RETRIEVE t[b'$_i$] from table T. In other words, call t[b'$_i$] = RETRIEVE(T, b'$_i$).     Compute R = R + t[b'$_i$]. Return R. |

| b' = CONVERT-PRESENTATION (b, w) |
|---|
| Let c and d be temporary integers. Set b' = 0. While (b ≠ 0) do the following     Set d = b mod W.     Set b = b / W.     Set b' = b' × W + d.     Set c = (W − d) >> w.    // causes window to right shift w-bits //     Set b = b − c. Return b'. |

T = STORE (t[0], . . . , t[2w−1])

Let n be the byte size of t[i].
Let T be an n·W bytes array.
For i = 0, . . . , W−1, and j = 0, . . . , n−1, set T[j·W + i] = t[i][j].

t[i] = RETRIEVE (T, i)

Let n be the byte size of t[i].
For j = 0, . . . , n−1, set t[i][j] = T[j·W + i].

In this form of point multiplication, P and R are points on an elliptic curve; b, b', c and d are very large unsigned integers (e.g., each possibly represented with hundreds of bits); w and W are relatively small integers (e.g., w=4); and each entry t of the table T stores a point on the elliptic curve.

The input variable b is examined using a "window" of w bits in width, with this "window" being moved along the full length of the large count of bits of input variable b by w bits at a time. In each group of w bits of the input variable b that window is caused to overlie, if all of those bits in that group of w bits are zero, then non-zero bits are borrowed from other bits of b previously overlain by the "window" in the CONVERT-PRESENTATION subprocedure called by the main procedure. This is to avoid a situation of concern in the case of elliptic curves in which one of the entries t of the table T is caused to become a point at infinity. In more conventional approaches to performing point-multiplication for elliptic curves, an explicit check would be made for zero values that could cause this situation in a branch instruction. Through the borrowing of non-zero bits from elsewhere in the input variable b, such use of branching is avoided.

Figure 6:
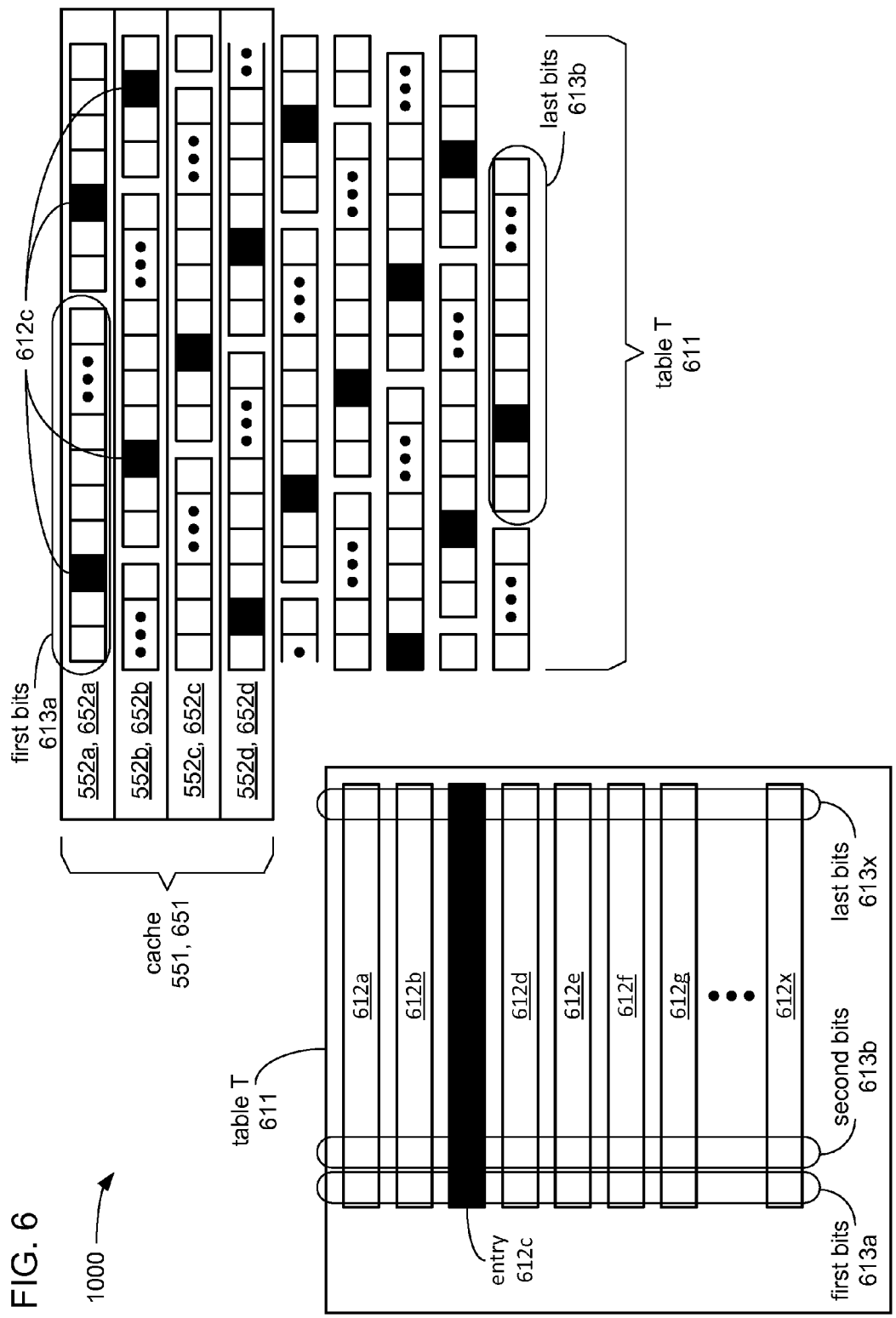
FIG. 6 illustrates cache operations occurring in the portions of either FIG. 5 or 6.

FIG. 6, depicts the manner in which bits of each of the entries t (designated with the reference numerals 612a through 612x) of the table T (designated with the reference numeral 611) are caused to be organized in the cache 551, 651 of whichever one of the processor circuits 550 or 650, respectively, that performs point multiplication in this manner. As depicted, the cache 551, 651 is comprised of cache lines 552a, 652a through 552d, 652d. However, as those skilled in the art will readily recognize, this is a relatively simplistic depiction of a relatively small cache configuration. Caches of other configurations, including other quantities of cache lines are possible.

Were the bits of the entries 612a-x to be organized in a more conventional manner, the bits of the entry 612a would be stored first in order of first bit to last bit, followed by the bits of the entry 612b in the same order, and so on. As previously discussed, this would be expected to result in the entries 612a, 612b and one or more of the first few entries of the table 611 being wholly stored within the cache lines 552a, 652a through 552d, 652d while latter ones of these entries would not yet be loaded into the cache 551, 651. Thus, as previously discussed, accesses to the earlier ones of these entries would result in cache hits, while access to the latter ones of these entries would result in cache misses, a difference in behavior that may be easily detectable by the malicious routine 545.

However, as depicted in FIG. 6, the bits of the entries 612a-x are interspersed in an order in which all of the first bits 613a of all of the entries are stored first, followed by all of the second bits 613b, and so on, ending with the storage of all of the last bits 613x. Stated differently, the bits are organized in the storage 560 or 660 (again, depending on which of the processor circuits performs point multiplication in this manner) in order of columns of bits that cut across the rows of entries 612a-x. As a result, regardless of which one of the entries 613a-x is accessed, the same cache behavior will always be caused to occur. Specifically, and as depicted, the table 611 is too large to entirely within the cache 551, 651, and as a result, every access to any of the entries 613a-x results in a cache miss since none of the entries can ever have all of their bits stored within the cache 551, 651 at any given time. Also as a result, there is relatively little variation in the execution time of this form of point multiplication.

To effect this manner of storing the bits of each of the entries t of the table T, the STORE and RETRIEVE subprocedures are called by the main procedure. The STORE subprocedure stores each entry t in a manner in which the bits of the point value of each entry t are interspersed as has been described, and the RETRIEVE procedure gathers those bits for a given one of the entries t into a single point value that it returns.

In various cryptosystems, calculations may include multi-exponentiation. As with the above example of point multiplication, conventional approaches to performing multi-exponentiation on a computing device entails forming a table of point values as a set of temporary variables. Again, this raises the aforedescribed concerns of behaviors of a cache system potentially providing clues to malicious software engaging in a side-channel attack by monitoring cache behavior. And again, to overcome this vulnerability, the formation of such tables is carried out by the processor circuit 550 or 650 under the control of the control routine 540 or 640, respectively, in such a way that results in the bits of each of the entries being interspersed as depicted in FIG. 6.

Thus, multi-exponentiation is performed as shown in the example implementation set forth in the table below in pseudocode detailing a main procedure for performing multi-exponentiation in a finite field group G that also makes use of the same STORE and RETRIEVE subprocedures set forth in the last two tables above:

$R = P0^{b0} \cdot P1^{b1} \cdot P2^{b2} \cdot P3^{b3}$
(multi-exponentiation)

Set w = 4 and W = 16.
Compute W temporary elements t[0], . . . , t[W−1] in finite field group G as follows:
    Set t[0] = 1,
    For j = 1, . . . , W−1,
        Let $j_3 \, j_2 \, j_1 \, j_0$ be the binary representation of j.
        Set $t[j] = P0^{j_0} \cdot P1^{j_1} \cdot P2^{j_2} \cdot P3^{j_3}$.
STORE t[0], . . . , t[W−1] in a table T.
Let $b0_n \ldots b0_1 \, b0_0$ be the binary representation of b0.
Let $b1_n \ldots b1_1 \, b1_0$ be the binary representation of b1.
Let $b2_n \ldots b2_1 \, b2_0$ be the binary representation of b2.
Let $b3_n \ldots b3_1 \, b3_0$ be the binary representation of b3.
Let $j = b0_n + 2 \cdot b1_n + 4 \cdot b2_n + 8 \cdot b3_n$.
RETRIEVE t[j] from table T.
Set R = t[j].
For i = n−1, . . . , 0
    R = G.mul(R, R).
    Compute $j = b0_i + 2 \cdot b1_i + 4 \cdot b2_i + 8 \cdot b3_i$.
    RETRIEVE t[j] from table T.
    Compute R = G.mul(R, t[j]).
Return R.

In this form of multi-exponentiation, R and P0 through P3 are elements of finite field group G; w, W, and b0 through b3 are unsigned integers; and each entry t of the table T stores an element of finite field group G. Again, through the use of the STORE and RETRIEVE subprocedures, the possibility of the cache 551, 651 of whichever one of the processor circuits 550 or 650 performs this form of multi-exponentiation behaving differently (e.g., cache hit versus cache miss) depending on which entry t of the table T is accessed is avoided. As a result, there is relatively little variation in the execution time of this form of the multi-exponentiation, thereby depriving the malicious routine 545 of at least some clues needed for a successful side-channel attack.

Depending on the cryptosystem used, different one of the above forms of modular arithmetic operations, the above form of point multiplication and/or the above form of multi-exponentiation may be used in different aspects of authenticating the member device 500, such as key generation, digital signing and signature verification. In essence, the above forms of modular addition, modular subtraction, modular negation, point multiplication and multi-exponentiation may be regarded as "building blocks" that may be used in implementing various ones of these authentication-related calculations in place of their more conventional counterparts to enhance security by mitigating risks arising from side-channel attacks. Thus, one or more of these side-channel resistant operations and/or procedures may be employed in implementing any of a variety of cryptosystems, despite references herein to specific cryptosystems.

Where ECC is employed, and returning to FIG. 1, the processor circuit 150 of the issuing server 100 may be caused by the control routine 140 to employ the above form of point multiplication in generating the group public key 133 and the group private key 134. Further, the processor circuit 150 may again be caused by the control routine 140 to employ the above form of point multiplication in generating the multiple member private keys 135, including the member private key 635 provided to the member device 500. Alternatively, the generation of the member private key 635 may be a collaborative process between the issuing server 100 and the member device 500 in which the processor 550 or 650 is caused by control routine 540 or 640, respectively, to employ the above forms of point multiplication and modular arithmetic in assisting in the generation of the member private key 635.

However, as previously explained, it is envisioned that calculations performed on the member device 500 by whichever one of the processor circuits 550 or 650 will be most at risk for a side-channel attack. Where the member device 500 does incorporate the controller 600, a first defense against side-channel attack by the malicious routine 545 is the relative isolation of the operating environment of the controller 600 from the rest of the member device 500. In such a version of the member device 500 where the processor circuit 650 performs authentication-related calculations substantially without involvement of the processor circuit 550, the malicious routine 545 may have little opportunity to detect much in the way of useful clues. However, where the processor circuit 550 is employed in performing at least a portion of such calculations (either in assisting the processor circuit 650 or as a result of the controller 600 not being present), then the malicious routine 545 may have more opportunities to monitor for clues as part of a side-channel attack. Regardless of whether of which one of the processor circuits 550 or 650 perform these calculations, one or more of the above forms of modular arithmetic, point multiplication and multi-exponentiation may be employed in digitally signing a message to send to the verifying server 300. In this way, execution times, cache behavior and patterns of memory address access remain relatively consistent, having relatively little variation for one instance of these calculations being executed to the next.

Similarly, one or the other of the processor circuits 550 or 650 may be caused to employ the above forms of modular arithmetic and multi-exponentiation in digitally signing each of the revoked signatures of the signature blacklist 338 sent by the verifying server 300 with the member private key 635 as part of effecting signature-based revocation. Again, in using these forms of modular arithmetic and multi-exponentiation, branches and cache behaviors that could provide clues of value for a side-channel attack by the malicious routine 545 are avoided.

Figure 7:
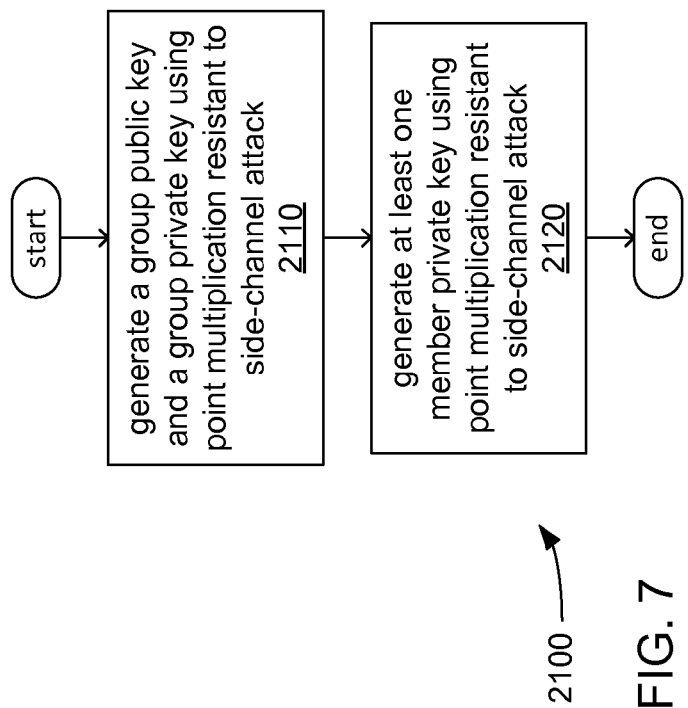
FIG. 7 illustrates an embodiment of a first logic flow.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor circuit 150 of the issuing server 100 in executing at least the control routine 140.

At 2110, an issuing server (e.g., the issuing server 100) generates a group public key (e.g., the group public key 133) and a group private key (e.g., the group private key 134) using a form of point multiplication made resistant to side-channel attack through elimination of the use of branch instructions and through use of a manner of organizing bits of entries of a table of temporary variables that forces a cache (e.g., the cache 151) to always behave in the same manner (e.g., always a cache miss) whenever an entry of that table is accessed, despite having a portion of that table already loaded in that cache.

At 2120, the issuing server generates at least one member private key (e.g., one of the multiple member private keys 135, such as the member private key 635) again using a form of point multiplication made resistant to side-channel attack.

Figure 8:
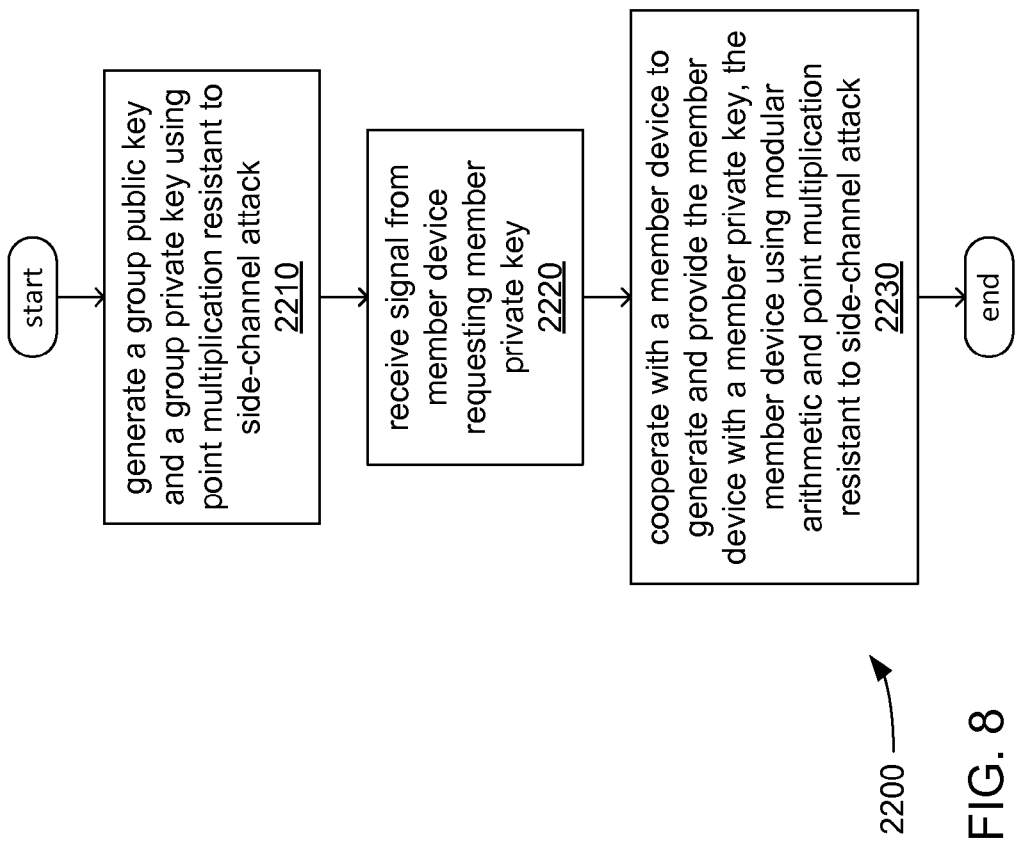
FIG. 8 illustrates an embodiment of a second logic flow.

FIG. 8 illustrates one embodiment of a logic flow 2200. The logic flow 2200 may be representative of some or all of the operations executed by one or more embodiments described herein. More specifically, the logic flow 2200 may illustrate operations performed by the processor circuit 150 of the issuing server 100 in executing at least the control routine 140, in cooperation with the processor circuit 550 or 650 of the member device 500 in executing at least the control routine 540 or 640, respectively.

At 2210, an issuing server (e.g., the issuing server 100) generates a group public key (e.g., the group public key 133) and a group private key (e.g., the group private key 134) using a form of point multiplication made resistant to side-channel attack through elimination of the use of branch instructions and through use of a manner of organizing bits of entries of a table of temporary variables that forces a cache (e.g., the cache 151) to always behave in the same manner (e.g., always a cache miss) whenever an entry of that table is accessed, despite having a portion of that table already loaded in that cache.

At 2220, the issuing server receives a signal from a member device (e.g., the member device 500) requesting a member private key (e.g., the member private key 635).

At 2230, in response to receiving the request, the issuing server cooperates with the member device to generate and provide the member device with a member private key, in which at least the member device employs point multiplication made resistant to side-channel attack in the manner just described, and using modular arithmetic made resistant to side-channel attack through elimination of branch instructions otherwise normally present to compare values to a modulus. As has been discussed, the member device may be required to be authenticated by the issuing server by providing the issuing server with either an initial private key (e.g., the initial private key 632) or by providing the issuing server with a signature created using the initial private key.

Figure 9:
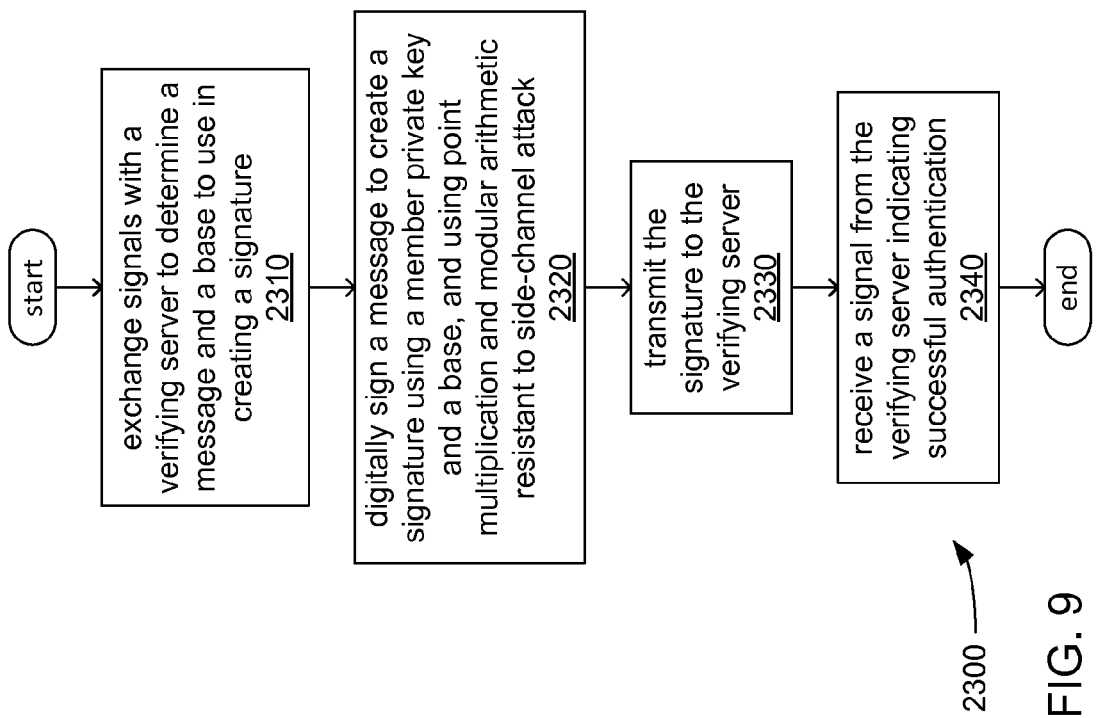
FIG. 9 illustrates an embodiment of a third logic flow.

FIG. 9 illustrates one embodiment of a logic flow 2300. The logic flow 2300 may be representative of some or all of the operations executed by one or more embodiments described herein. More specifically, the logic flow 2300 may illustrate operations performed by one of the processor circuits 550 or 650 of the member device 500 in executing at least the control routine 540 or 640, respectively.

At 2310, a member device (e.g., the member device 500) exchanges signals with a verifying server (e.g., the verifying server 300) to agree upon and select a message (e.g., the message 336) and a base (e.g., the name base 637 or a randomly generated base) to be used by the member device in creating a digital signature (e.g., the signature 638) to provide to the verifying server.

At 2320, having selected a message and a base, the member device digitally signs the message using its member private key (e.g., the member private key 635) and the base, and using point multiplication and modular arithmetic made resistant to side-channel attack in the various ways previously discussed.

At 2330, the member device transmits the signature to the verifying server, and at 2340, the member device receives a signal from the verifying server indicating successful authentication of the member device.

Figure 10:
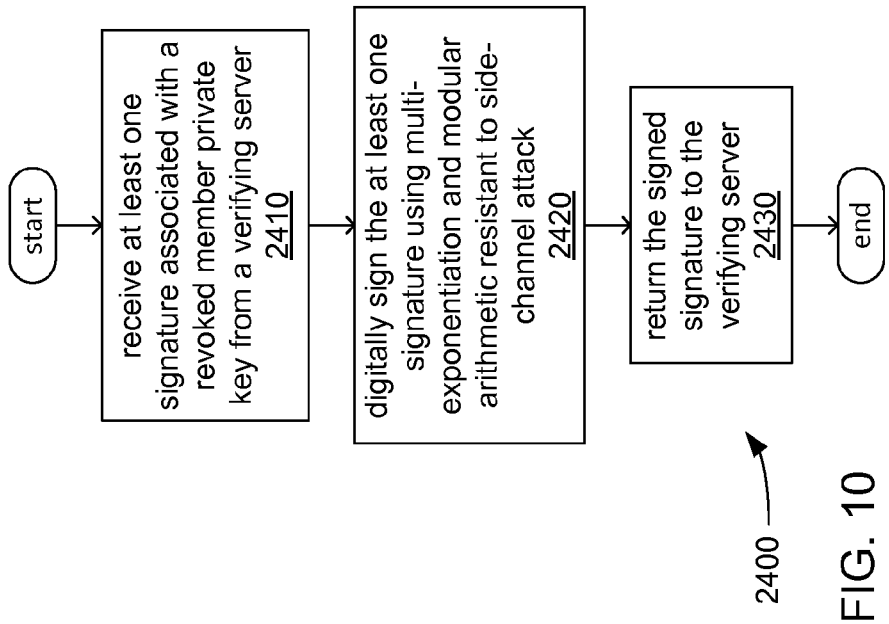
FIG. 10 illustrates an embodiment of a fourth logic flow.

FIG. 10 illustrates one embodiment of a logic flow 2400. The logic flow 2400 may be representative of some or all of the operations executed by one or more embodiments described herein. More specifically, the logic flow 2400 may illustrate operations performed by one of the processor circuits 550 or 650 of the member device 500 in executing at least the control routine 540 or 640, respectively.

At 2410, a member device (e.g., the member device 500) receives at least one signature associated with a revoked member private key (e.g., at least one signature of the signature blacklist 338) from a verifying server (e.g., the verifying server 300).

At 2420, the member device digitally signs the received signature using multi-exponentiation made resistant to side-channel attack through organizing bits of entries of a table of temporary values in such a way as to force a cache (e.g., the cache 551 or 651) to always behave in the same manner (e.g., always a cache miss) whenever an entry of that table is accessed, and modular arithmetic made resistant to side-channel attack through elimination of the use of branch instructions in used to compare values to a modulus.

At 2430, the member device transmits the at least one signature (now signed by the member device) back to the verifying server.

Figure 11:
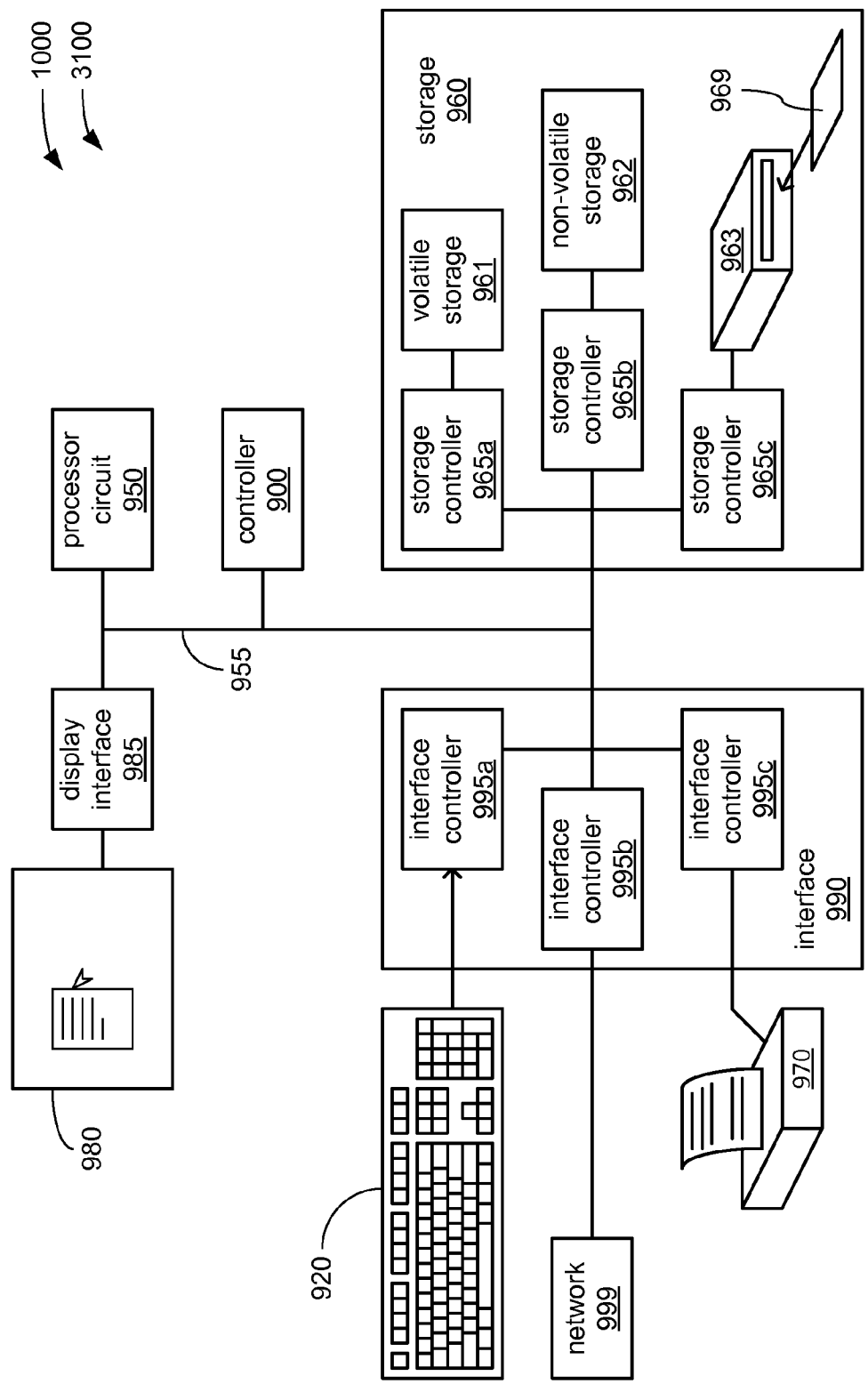
FIG. 11 illustrates an embodiment of a processing architecture.

FIG. 11 illustrates an embodiment of an exemplary processing architecture 3100 suitable for implementing various embodiments as previously described. More specifically, the processing architecture 3100 (or variants thereof) may be implemented as part of one or more of the computing devices 100, 300 and 500, and/or by the controller 600. It should be noted that components of the processing architecture 3100 are given reference numbers in which the last two digits correspond to the last two digits of reference numbers of components earlier depicted and described as part of each of the computing devices 100, 300 and 500, as well as the controller 600. This is done as an aid to correlating such components of whichever ones of the computing devices 100, 300 and 500, and/or the controller 600 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a controller 900.

The coupling 955 is comprised of one or more buses, point-to-point interconnects, transceivers, buffers, crosspoint switches, and/or other conductors and/or logic that communicatively couples at least the processor circuit 950 to the storage 960. The coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 300 and 500, and/or the controller 600 implement the processing architecture 3100. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350, 550 and 650) may comprise any of a wide variety of commercially available processors, employing any of a wide variety of technologies and implemented with one or more cores physically combined in any of a number of ways.

As previously discussed, the storage 960 (corresponding to one or more of the storages 160, 360, 560 and 660) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 390, 590 and 690) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Further, where the display interface 985 is present in a computing device implementing the processing architecture 3100, an ocular tracker 981 may also be coupled to the interface 985 to track ocular movements of at least one eye of a person viewing the display 980. Alternatively, the ocular tracker 981 may be incorporated into the computer architecture 3100 in some other manner. The ocular tracker 981 may employ any of a variety of technologies to monitor ocular movements, including and not limited to, infrared light reflection from the cornea.

More generally, the various elements of the computing devices 100, 300 and 500 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a processor circuit, an interface operative to communicatively couple the processor circuit to a network, and a storage communicatively coupled to the processor circuit and arranged to store instructions. The instructions are operative on the processor circuit to digitally sign a message to create a first signature using a modular arithmetic operation arranged to compensate for a value of a variable greater than a modulus without use of a branching instruction; and transmit the first signature to a verifying server via the network.

The above example of an apparatus in which the modular arithmetic operation comprises one of modular addition, modular subtraction and modular negation.

Either of the above examples of an apparatus in which the instructions are operative on the processor circuit to perform the modular arithmetic operation by deriving a bitwise mask; deriving a complement of the mask; employing the mask in a first logical AND operation and the complement of the mask in a second logical AND operations; and deriving a result of the modular arithmetic operation by combining the results of the first and second logical AND operations in an OR operation.

Any of the above examples of an apparatus in which the instructions are operative on the processor circuit to exchange signals via the network with the verifying server to select the message and the base.

Any of the above examples of an apparatus in which the instructions are operative on the processor circuit to exchange the base with the verifying server via the network.

Any of the above examples of an apparatus in which the apparatus comprises a controller, the controller comprising a random number generator, the instructions operative on the processor circuit to signal the random number generator to randomly generate the base.

Any of the above examples of an apparatus in which the instructions are operative on the processor circuit to digitally sign the message to create the first signature using a point multiplication operation arranged to generate a table comprising multiple entries, each entry comprising multiple bits, the bits of the multiple bits of each entry interspersed within the table to force a cache miss each time a portion of the table stored in a cache of the processor circuit is accessed.

Any of the above examples of an apparatus in which the instructions are operative on the processor circuit to employ elliptic curve cryptography in digitally signing the message, and the point multiplication operation arranged to prevent an instance of an infinite point without use of a branch instruction to compare a variable to zero.

Any of the above examples of an apparatus in which the instructions are operative on the processor circuit to signal an issuing server via the network to request the member private key; create a second signature using an initial private key stored in the storage; transmit the second signature to the issuing server; and receive the member private key.

An example of another apparatus comprises a processor circuit, and an interface operative to communicatively couple the processor circuit to a network, and a storage communicatively coupled to the processor circuit and arranged to store instructions. The instructions are operative on the processor circuit to digitally sign a message to create a first signature using a point multiplication operation arranged to generate a table comprising multiple entries, each entry comprising multiple bits, the bits of the multiple bits of each entry interspersed within the table to force a cache miss each time a portion of the table stored in a cache of the processor circuit is accessed; and transmit the first signature to a verifying server via the network.

The above example of another apparatus in which the instructions are operative on the processor circuit to employ elliptic curve cryptography in digitally signing the message, and the point multiplication operation arranged to prevent an instance of an infinite point without use of a branch instruction to compare a variable to zero.

Either of the above examples of another apparatus in which the instructions are operative on the processor circuit to exchange signals via the network with the verifying server to select the message and the base.

Any of the above examples of another apparatus in which the instructions are operative on the processor circuit to exchange the base with the verifying server via the network.

Any of the above examples of another apparatus in which the apparatus comprises a controller, the controller comprising a random number generator, the instructions operative on the processor circuit to signal the random number generator to randomly generate the base.

Any of the above examples of another apparatus in which the instructions are operative on the processor circuit to digitally sign the message to create the first signature using a modular arithmetic operation arranged to compensate for a value of a variable greater than a modulus without use of a branching instruction, the modular arithmetic operation comprising one of modular addition, modular subtraction and modular negation.

Any of the above examples of another apparatus in which the instructions are operative on the processor circuit to perform the modular arithmetic operation by deriving a bitwise mask; deriving a complement of the mask; employing the mask in a first logical AND operation and the complement of the mask in a second logical AND operations; and deriving a result of the modular arithmetic operation by combining the results of the first and second logical AND operations in an OR operation.

Any of the above examples of another apparatus in which the instructions are operative on the processor circuit to signal an issuing server via the network to request the member private key; create a second signature using an initial private key stored in the storage; transmit the second signature to the issuing server; and receive the member private key.

An example of a computer-implemented method comprises generating a random number; generating a member private key from a group public key, a group private key and the random number using a point multiplication operation arranged to generate a table comprising multiple entries, each entry comprising multiple bits, the bits of the multiple bits of each entry interspersed within the table to force a cache miss each time a portion of the table stored in a cache of a processor circuit is accessed; and providing the member private key to a member device.

The above example of a computer-implemented method in which the method comprises employing elliptic curve cryptography in generating the member private key, the point multiplication operation arranged to prevent an instance of an infinite point without use of a branch instruction to compare a variable to zero.

Either of the above examples of a computer-implemented method in which the method comprises receiving a signal from the member device requesting the member private key; receiving a signature from the member device created with an initial private key; and verifying the signature with an initial public key.

Any of the above examples of a computer-implemented method in which the method comprises generating a group public key and a group private key using the point multiplication operation.

Any of the above examples of a computer-implemented method in which generating the member private key comprises using a modular arithmetic operation arranged to compensate for a value of a variable greater than a modulus without use of a branching instruction, the modular arithmetic operation comprising one of modular addition, modular subtraction and modular negation.

Any of the above examples of a computer-implemented method in which performing the modular arithmetic operation comprises deriving a bitwise mask; deriving a complement of the mask; employing the mask in a first logical AND operation and the complement of the mask in a second logical AND operations; and deriving a result of the modular arithmetic operation by combining the results of the first and second logical AND operations in an OR operation.

An example of at least one machine-readable storage medium comprises instructions that when executed by a computing device, causes the computing device to digitally sign a message to create a signature using a modular arithmetic operation arranged to compensate for a value of a variable greater than a modulus without use of a branching instruction; and transmit the signature to a verifying server via the network.

The above example of at least one machine-readable storage medium in which the modular arithmetic operation comprising one of modular addition, modular subtraction and modular negation.

Either of the above examples of at least one machine-readable storage medium in which the computing device is caused to perform the modular arithmetic operation by deriving a bitwise mask; deriving a complement of the mask; employing the mask in a first logical AND operation and the complement of the mask in a second logical AND operations; and deriving a result of the modular arithmetic operation by combining the results of the first and second logical AND operations in an OR operation.

Any of the above examples of at least one machine-readable storage medium in which the computing device is caused to digitally sign the message to create the signature using a point multiplication operation arranged to generate a table comprising multiple entries, each entry comprising multiple bits, the bits of the multiple bits of each entry interspersed within the table to force a cache miss each time a portion of the table stored in a cache of a processor circuit of the computing device is accessed.

Any of the above examples of at least one machine-readable storage medium in which the computing device is caused to employ elliptic curve cryptography in digitally signing the message, and the point multiplication operation arranged to prevent an instance of an infinite point without use of a branch instruction to compare a variable to zero.

The invention claimed is:

1. An apparatus comprising:
   a processor circuit;
   an interface operative to communicatively couple the processor circuit to a network; and
   a storage communicatively coupled to the processor circuit and arranged to store instructions operative on the processor circuit to:
      digitally sign a message to create a first signature using a modular arithmetic operation and a point multiplication operation, the modular arithmetic operation arranged to compensate for a value of a variable greater than a modulus without use of a branching instruction, the point multiplication operation arranged to prevent an instance of an infinite point without use of a branch instruction to compare a variable to zero, the point multiplication operation to comprise identifying a window size comprising a number of bits and an input variable comprising a first positive integer, converting the first positive integer to a second positive integer by performing operations including one or more bitwise shifts by the number of bits, and deriving a point on an elliptic curve based on the second positive integer; and
      transmit the first signature to a verifying server via the network.

2. The apparatus of claim 1, the modular arithmetic operation comprising modular negation.

3. The apparatus of claim 1, the instructions operative on the processor circuit to perform the modular arithmetic operation by:
   deriving a bitwise mask;
   deriving a complement of the mask;
   employing the mask in a first logical AND operation and the complement of the mask in a second logical AND operations; and
   deriving a result of the modular arithmetic operation by combining the results of the first and second logical AND operations in an OR operation.

4. The apparatus of claim 1, the instructions operative on the processor circuit to exchange signals via the network with the verifying server to select the message and a base.

5. The apparatus of claim 4, the instructions operative on the processor circuit to exchange the base with the verifying server via the network.

6. The apparatus of claim 1, comprising a controller, the controller comprising a random number generator, the instructions operative on the processor circuit to signal the random number generator to randomly generate a base.

7. The apparatus of claim 1, the point multiplication operation arranged to generate a table comprising multiple entries, each entry comprising multiple bits, the bits of the multiple bits of each entry interspersed within the table to force a cache miss each time a portion of the table stored in a cache of the processor circuit is accessed.

8. The apparatus of claim 7, the instructions operative on the processor circuit to employ elliptic curve cryptography in digitally signing the message.

9. The apparatus of claim 1, the instructions operative on the processor circuit to:
   signal an issuing server via the network to request a member private key;
   create a second signature using an initial private key stored in the storage;
   transmit the second signature to the issuing server; and
   receive the member private key.

10. An apparatus comprising:
    a processor circuit;
    an interface operative to communicatively couple the processor circuit to a network; and
    a storage communicatively coupled to the processor circuit and arranged to store instructions operative on the processor circuit to:
       digitally sign a message to create a first signature using a point multiplication operation arranged to generate a table comprising multiple entries, each entry comprising multiple bits, the bits of the multiple bits of each entry interspersed within the table to force a cache miss each time a portion of the table stored in a cache of the processor circuit is accessed, the point multiplication operation arranged to prevent an instance of an infinite point without use of a branch instruction to compare a variable to zero, the point multiplication operation to comprise identifying a window size comprising a number of bits and an input variable comprising a first positive integer, converting the first positive integer to a second positive integer by performing operations including one or more bitwise shifts by the number of bits, and deriving a point on an elliptic curve based on the second positive integer; and
       transmit the first signature to a verifying server via the network.

11. The apparatus of claim 10, the instructions operative on the processor circuit to employ elliptic curve cryptography in digitally signing the message.

12. The apparatus of claim 10, the instructions operative on the processor circuit to exchange signals via the network with the verifying server to select the message and a base.

13. The apparatus of claim 12, the instructions operative on the processor circuit to exchange the base with the verifying server via the network.

14. The apparatus of claim 10, comprising a controller, the controller comprising a random number generator, the instructions operative on the processor circuit to signal the random number generator to randomly generate a base.

15. The apparatus of claim 10, the instructions operative on the processor circuit to digitally sign the message to create the first signature using a modular arithmetic operation arranged to compensate for a value of a variable greater than a modulus without use of a branching instruction, the modular arithmetic operation comprising one of modular addition, modular subtraction and modular negation.

16. The apparatus of claim 15, the instructions operative on the processor circuit to perform the modular arithmetic operation by:
deriving a bitwise mask;
deriving a complement of the mask;
employing the mask in a first logical AND operation and the complement of the mask in a second logical AND operations; and
deriving a result of the modular arithmetic operation by combining the results of the first and second logical AND operations in an OR operation.

17. The apparatus of claim 10, the instructions operative on the processor circuit to:
signal an issuing server via the network to request a member private key;
create a second signature using an initial private key stored in the storage;
transmit the second signature to the issuing server; and
receive the member private key.

18. A computer-implemented method comprising:
generating a random number;
generating a member private key from a group public key, a group private key and the random number using a point multiplication operation arranged to generate a table comprising multiple entries, each entry comprising multiple bits, the bits of the multiple bits of each entry interspersed within the table to force a cache miss each time a portion of the table stored in a cache of a processor circuit is accessed, the point multiplication operation arranged to prevent an instance of an infinite point without use of a branch instruction to compare a variable to zero, the point multiplication operation to comprise identifying a window size comprising a number of bits and an input variable comprising a first positive integer, converting the first positive integer to a second positive integer by performing operations including one or more bitwise shifts by the number of bits, and deriving a point on an elliptic curve based on the second positive integer; and
providing the member private key to a member device.

19. The computer-implemented method of claim 18, comprising employing elliptic curve cryptography in generating the member private key.

20. The computer-implemented method of claim 18, comprising:
receiving a signal from the member device requesting the member private key;
receiving a signature from the member device created with an initial private key; and
verifying the signature with an initial public key.

21. The computer-implemented method of claim 18, comprising generating a group public key and a group private key using the point multiplication operation.

22. The computer-implemented method of claim 18, generating the member private key comprises using a modular arithmetic operation arranged to compensate for a value of a variable greater than a modulus without use of a branching instruction, the modular arithmetic operation comprising one of modular addition, modular subtraction and modular negation.

23. The computer-implemented method of claim 18, performing the modular arithmetic operation comprises:
deriving a bitwise mask;
deriving a complement of the mask;
employing the mask in a first logical AND operation and the complement of the mask in a second logical AND operations; and
deriving a result of the modular arithmetic operation by combining the results of the first and second logical AND operations in an OR operation.

24. At least one non-transitory machine-readable storage medium comprising instructions that when executed by a computing device, causes the computing device to:
digitally sign a message to create a signature using a modular arithmetic operation and a point multiplication operation, the modular arithmetic operation arranged to compensate for a value of a variable greater than a modulus without use of a branching instruction, the point multiplication operation arranged to prevent an instance of an infinite point without use of a branch instruction to compare a variable to zero, the point multiplication operation to comprise identifying a window size comprising a number of bits and an input variable comprising a first positive integer, converting the first positive integer to a second positive integer by performing operations including one or more bitwise shifts by the number of bits, and deriving a point on an elliptic curve based on the second positive integer; and
transmit the signature to a verifying server via a network.

25. The at least one non-transitory machine-readable storage medium of claim 24, the modular arithmetic operation comprising modular negation.

26. The at least one non-transitory machine-readable storage medium of claim 24, the computing device caused to perform the modular arithmetic operation by:
deriving a bitwise mask;
deriving a complement of the mask;
employing the mask in a first logical AND operation and the complement of the mask in a second logical AND operations; and
deriving a result of the modular arithmetic operation by combining the results of the first and second logical AND operations in an OR operation.

27. The at least one non-transitory machine-readable storage medium of claim 24, the point multiplication operation arranged to generate a table comprising multiple entries, each entry comprising multiple bits, the bits of the multiple bits of each entry interspersed within the table to force a cache miss each time a portion of the table stored in a cache of a processor circuit of the computing device is accessed.

28. The at least one non-transitory machine-readable storage medium of claim 27, the computing device caused to employ elliptic curve cryptography in digitally signing the message.

* * * * *